US012593387B1

(12) United States Patent
Li et al.

(10) Patent No.: US 12,593,387 B1
(45) Date of Patent: Mar. 31, 2026

(54) STREET LAMP

(71) Applicant: Zhongshan Bestwon Lighting Co., Ltd., Zhongshan (CN)

(72) Inventors: Zongwang Li, Shenzhen (CN); Xu Wang, Shaoyang (CN)

(73) Assignee: Zhongshan Bestwon Lighting Co., Ltd., Zhongshan (CN)

( * ) Notice: Subject to any disclaimer, the term of this patent is extended or adjusted under 35 U.S.C. 154(b) by 0 days.

(21) Appl. No.: 19/013,988

(22) Filed: Jan. 8, 2025

(30) Foreign Application Priority Data

Dec. 13, 2024 (CN) ......................... 202411840169.8

(51) Int. Cl.

| | |
|---|---|
| ***H05B 47/155*** | (2020.01) |
| ***F21V 5/00*** | (2018.01) |
| ***F21V 19/00*** | (2006.01) |
| ***F21V 23/02*** | (2006.01) |
| ***H05B 45/10*** | (2020.01) |
| ***H05B 47/17*** | (2020.01) |
| *F21Y 115/10* | (2016.01) |

(52) U.S. Cl.

CPC ........... *H05B 47/155* (2020.01); *F21V 5/007* (2013.01); *F21V 19/005* (2013.01); *F21V 23/023* (2013.01); *H05B 45/10* (2020.01); *H05B 47/17* (2020.01); *F21Y 2115/10* (2016.08)

(58) Field of Classification Search

CPC ...... H05B 45/10; H05B 47/17; H05B 47/155; F21V 5/007; F21V 19/005; F21V 23/023; F21V 29/75; F21V 29/83; F21V 29/763; F21Y 2115/10

See application file for complete search history.

(56) References Cited

U.S. PATENT DOCUMENTS

| | | | | |
|---|---|---|---|---|
| 7,686,469 B2 * | 3/2010 | Ruud | ...................... | F21S 9/022<br>362/249.02 |
| 8,641,234 B2 * | 2/2014 | Dube | ...................... | F21V 29/73<br>362/240 |
| 2008/0080196 A1 * | 4/2008 | Ruud | ...................... | F21V 31/03<br>362/373 |
| 2009/0251898 A1 * | 10/2009 | Kinnune | ................. | F21V 19/04<br>362/249.02 |

(Continued)

FOREIGN PATENT DOCUMENTS

| | | |
|---|---|---|
| CN | 206765834 U | 12/2017 |
| CN | 110148895 A | 8/2019 |
| CN | 117714492 A | 3/2024 |

*Primary Examiner* — Tung X Le

(74) *Attorney, Agent, or Firm* — Wang Law Firm, Inc.

(57) ABSTRACT

The present disclosure claims a street lamp, comprising a lamp housing and a carrier panel, a light transmission panel, a lamp panel, a light supplement assembly and a controller respectively arranged in the lamp housing; the light supplement assembly comprises a plurality of light supplement strips; the carrier panel is provided with a plurality of spaced convex strips; the light transmission panel is provided with a plurality of convex ribs; a bottom of the convex rib is provided with a groove to match the corresponding convex strip, an upper surface of the convex rib is inclined and parallel to an upper surface of the convex strip; the controller is electrically connected to the light panel and the light supplement strip, respectively, so as to control on/off states of the light panel and the plurality of light supplement strips.

10 Claims, 8 Drawing Sheets

(56) References Cited

U.S. PATENT DOCUMENTS

| | | | | |
|---|---|---|---|---|
| 2009/0268477 | A1* | 10/2009 | Zheng | F21V 29/763 362/373 |
| 2015/0316249 | A1* | 11/2015 | Kinnune | F21V 29/83 362/249.02 |

* cited by examiner

Photometrics Pro

Luminaire Photometric Report

Filename: T2 separate light type.1
Lamp Output: 1 lamp, rated Lumens/lamp: 10000
Max Candela: 6,162.9 at Horizontal: 290°, Vertical: 70°
Input Wattage: 1
Luminous Opening: Point
Test Lab: LightTools Simulation
Photometry : Type C
Nema Type: 7 X 6

Photometrics Pro

Luminaire Photometric Report

Filename: Combination plus 20 physical deflection.1
Lamp Output: 2 lamps, rated Lumens/lamp: 5000
Max Candela: 5,208.6 at Horizontal: 290°, Vertical: 70°
Input Wattage: 1
Luminous Opening: Point
Test Lab: LightTools Simulation
Photometry : Type C
Nema Type: 7 X 7

STREET LAMP

CROSS-REFERENCE TO RELATED APPLICATIONS

The application claims priority to Chinese patent application No. 2024118401698, filed on Dec. 13, 2024, the entire contents of which are incorporated herein by reference.

TECHNICAL FIELD

The present disclosure relates to the technical field of luminaires, in particular to a street lamp.

BACKGROUND

The Illuminating Engineering Society of North America (IESNA) has defined the lighting requirements for road and area lighting fixtures, including Type I, Type II, Type III and Type IV, based on the photometric characteristics of luminaires, the lighting distance to the pavement at 50% of the maximum light intensity, and the maximum light intensity value. Among them, Type I means that the lateral road width covered by the street lamp lighting is within 1.0 times of the height of lamps; Type II means that the lateral road width covered by the street lamp lighting is between 1.0 and 1.75 times of the height of lamps; Type III means that the lateral road width covered by the street lamp lighting is between 1.75 and 2.75 times of the height of lamps; Type IV means that the lateral road width covered by the street lamp lighting is more than 2.75 times of the height of lamps. Most of the existing street lamps have only one beam angle, which can only meet one of the lighting requirements of Type I, Type II, Type III and Type IV. In order to meet more than two lighting requirements, in the prior art, a high-cost electronically controlled dimming method, a method involving manual replacement of lenses or a method configured with multiple lenses to match the lamp panel to switch the beam angle is employed. These solutions are all costly and have a low cost performance.

SUMMARY

An object of the present disclosure is to solve at least one of the technical problems existing in the prior art and provide a low-cost street lamp.

A street lamp according to an embodiment of the present disclosure, comprising a lamp housing and a carrier panel, a light transmission panel, a lamp panel, a light supplement assembly and a controller respectively arranged in the lamp housing; the light supplement assembly comprises a plurality of light supplement strips; the carrier panel is provided with a plurality of spaced convex strips, an upper surface of the convex strip is inclined; the lamp panel is arranged on a surface of the carrier panel, and the light supplement strips are pasted on an upper surface of the convex strip in a one-to-one correspondence manner; the light transmission panel is provided with a plurality of convex ribs, the plurality of convex ribs correspond to the plurality of convex strips one by one; a bottom of the convex rib is provided with a groove to match the corresponding convex strip, an upper surface of the convex rib is inclined and parallel to an upper surface of the convex strip, and a surface of the light transmission panel and an upper surface of the convex rib are provided with lenses to correspond to the lamp beads on the lamp panel and the light supplement assembly, respectively; the controller is electrically connected to the light panel and the light supplement strip, respectively, so as to control on/off states of the light panel and the plurality of light supplement strips, respectively, thereby realizing a plurality of light emitting.

According to some embodiments of the present disclosure, the lens on the light transmission panel is consistent with the lens on the convex rib in terms of specifications.

According to some embodiments of the present disclosure, the inclination directions of the upper surfaces of the plurality of convex strips are consistent, and the inclination directions of the corresponding upper surfaces of the plurality of convex ribs are consistent.

According to some embodiments of the present disclosure, an inclination angle $\delta$ of the upper surface of the convex strip ranges $0<\delta<90°$, and a ratio Q of a count of lamp beads of the light supplement assembly to a count of lamp beads of the lamp panel ranges from 10% to 50%.

According to some embodiments of the present disclosure, Q=30%.

According to some embodiments of the present disclosure, only the lamp panel illuminating can realize Type II lighting, and on the basis, when $\delta=20°$, both the lamp panel and the light supplement assembly illuminating can realize Type III lighting; when $\delta=30°$, both the lamp panel and the light supplement assembly illuminating can realize Type IV lighting.

According to some embodiments of the present disclosure, when $\delta=25°$, Type III lighting can be realized when the light panel illuminates and the light supplement assembly illuminates with a brightness of 30%; and Type IV lighting can be realized when the light panel illuminates and the light supplement assembly illuminates with a brightness of 100%.

According to some embodiments of the present disclosure, the light supplement assembly illuminates with a brightness of 30%, including that only 30% of the light supplement strips illuminate and the brightness of all the light supplement strips is 30%, respectively.

According to some embodiments of the present disclosure, the lamp housing consists of a first groove and a second groove, the controller and the carrier panel are arranged in the first groove, the light transmission panel is configured to cover an opening of the first groove, a power supply is arranged in the second groove, and the lamp housing is further provided with a power supply cover for covering the second groove.

According to some embodiments of the present disclosure, the street lamp further comprises an induction assembly electrically connected with the controller, and a through hole is arranged on the power supply cover for mounting the induction assembly.

The street lamp according to the embodiments of the present disclosure has at least the following beneficial effects: The LED lamp beads on the lamp panel arranged on the surface of the carrier panel form basic lighting through lenses on the light transmission panel. Since the upper surfaces of the convex ribs are inclined and the upper surfaces of the convex ribs are inclined, the light supplement strips arranged on the convex ribs are obliquely illuminated by the lenses on the convex ribs to form deflected lighting at a certain angle, so that an irradiation range is wider. The controller can form a variety of lighting combinations by controlling the basic lighting+deflected lighting on any convex strip. The more the light supplement strips are, the stronger the deflected lighting will be. When combined with the basic lighting, there is no need to replace lenses or combine lenses of various specifications, which can meet various lighting requirements, facilitate dimming and reduce costs.

Additional aspects and advantages of the present disclosure will be set forth in part in the following description, parts of which will become apparent from the following description or as will be appreciated by practice of the present disclosure.

BRIEF DESCRIPTION OF DRAWINGS

The present disclosure will be further described below with reference to the drawings.

DETAILED DESCRIPTION OF THE EMBODIMENTS

Figure 1:
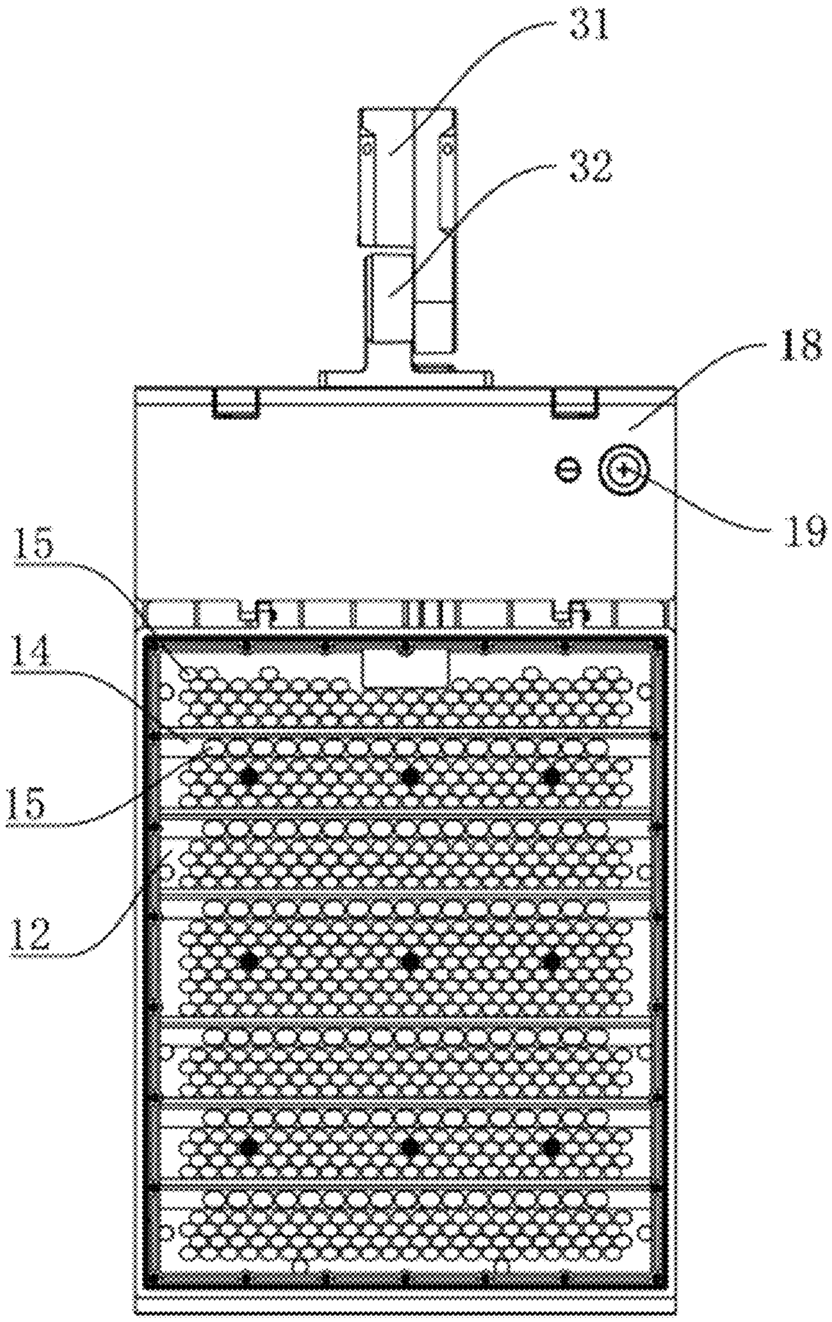
FIG. 1 is an overall structural diagram of a street lamp.

This part will describe the specific embodiments of the present disclosure in detail. The preferred embodiments of the present disclosure are as illustrated in the accompanying drawings, which serve to supplement the description of the text part of the specification with graphics so that people can visually and vividly understand each technical feature and overall technical solution of the present disclosure, but they cannot be understood as restrictions on the protection scope of the present disclosure.

In the description of the present disclosure, it should be understood that the azimuth or positional relationship related to the orientation description, such as "up", "down", "front", "rear", "left" and "right", is based on the azimuth or positional relationship shown in the drawings, which is only for facilitating the description of the present disclosure and simplifying the description, rather than indicating or implying that the target device or component must have a specific orientation and be structured and operated at a specific orientation, so it cannot be construed as limiting the present disclosure.

In the description of the present disclosure, "several" means one or more, and "a plurality of" means more than two; "greater than", "less than", "exceeding", etc. are understood as excluding the number itself, and "above", "below", "within", etc. are understood as including the number itself. If there is a description that the "first" and "second" are only for the purpose of distinguishing technical features, it cannot be understood as indicating or implying relative importance, implying the number of indicated technical features or implying the sequential relationship between the indicated technical features.

Referring to FIG. 1 to FIG. 8, a street lamp according to the present disclosure comprises a lamp housing 10 and a carrier panel 11, a light transmission panel 12, a lamp panel 20, a light supplement assembly and a controller respectively arranged in the lamp housing 10; the light supplement assembly comprises a plurality of light supplement strips 21; the carrier panel 11 is provided with a plurality of spaced convex strips 13; an upper surface of the convex strip 13 is inclined; the lamp panel 20 is arranged on a surface of the carrier panel 11; the light supplement strips 21 are pasted on an upper surface of the convex strip 13 in a one-to-one correspondence manner; the light transmission panel 12 is provided with a plurality of convex ribs 14, and the plurality of convex ribs 14 correspond to the plurality of convex strips 13 one by one; a bottom of the convex rib 14 is provided with a groove to match the corresponding convex strip 13; an upper surface of the convex rib 14 is inclined and parallel to the upper surface of the convex strip 13, and a surface of the light transmission panel 12 and an upper surface of the convex rib 14 are provided with lenses 15 to correspond to the lamp beads on the lamp panel 20 and the light supplement assembly, respectively; the controller is electrically connected to the light panel 20 and the light supplement strip 21, respectively, so as to control on/off states of the light panel 20 and the plurality of light supplement strips 21, respectively, thereby realizing a plurality of lighting. The LED lamp beads on the lamp panel arranged on the surface of the carrier panel form basic lighting through lenses on the light transmission panel. Since the upper surfaces of the convex ribs are inclined and the upper surfaces of the convex ribs are inclined, the light supplement strips arranged on the convex ribs are obliquely illuminated by the lenses on the convex ribs to form deflected lighting at a certain angle, so that an irradiation range is wider. The controller can form a variety of lighting combinations by controlling the basic lighting+deflected lighting on any convex strip (see the following specific embodiments for specific lighting combinations).

In some embodiments, the lens 15 on the light transmission panel 12 is consistent with the lens 15 on the convex rib 14 in terms of specifications. The more the light supplement strips are, the stronger the deflected lighting will be. When combined with the basic lighting, there is no need to replace lenses or combine lenses of various specifications, which can meet various lighting requirements, facilitate dimming and reduce costs.

Further, the inclination directions of the upper surfaces of the plurality of convex strips 13 are consistent, and the inclination directions of the corresponding upper surfaces of the plurality of convex ribs 14 are consistent, so that the directions of deflected lighting are consistent, and the deflection angle is increased.

Figure 2:
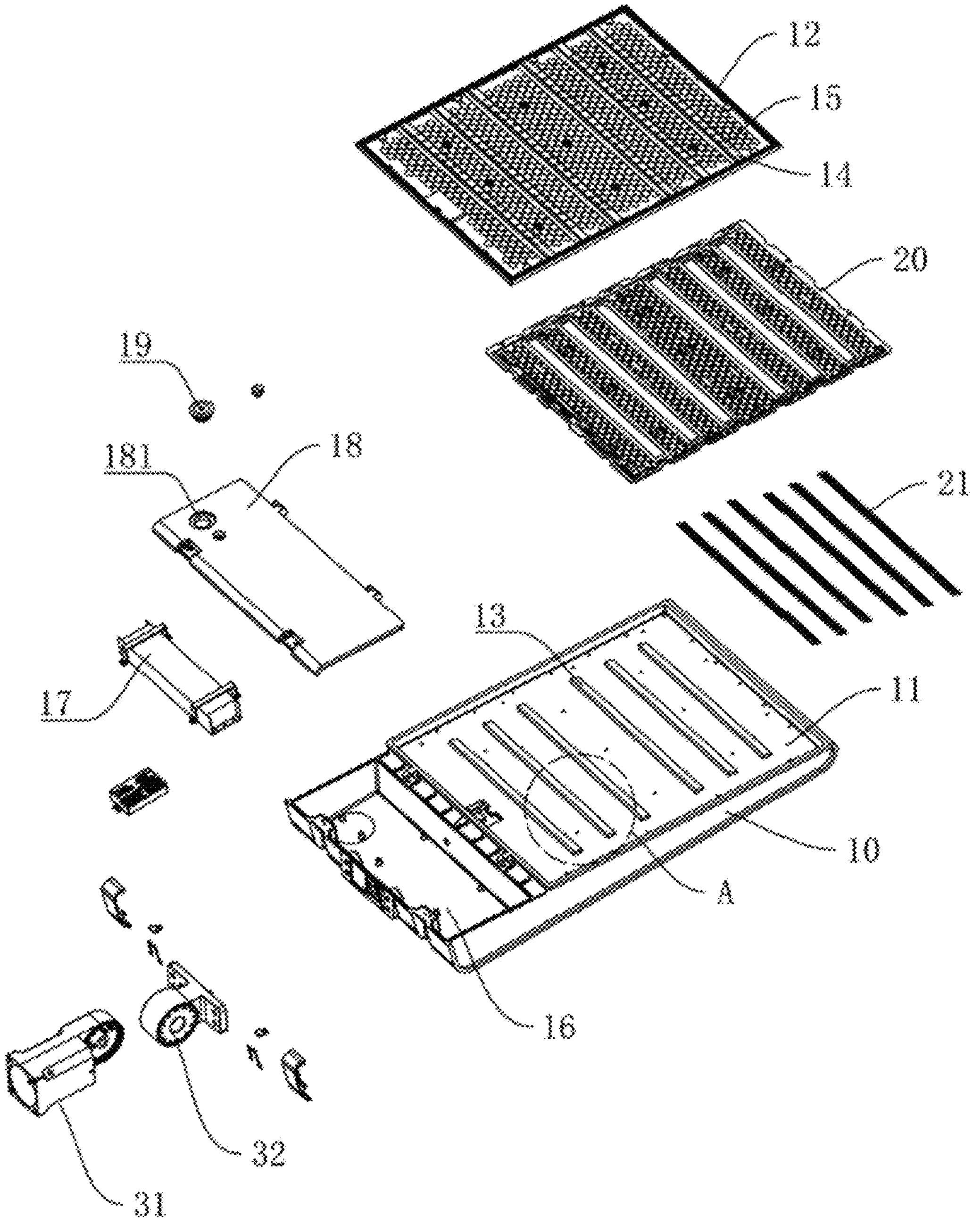
FIG. 2 is an exploded structural diagram of a street lamp.
Figure 3:
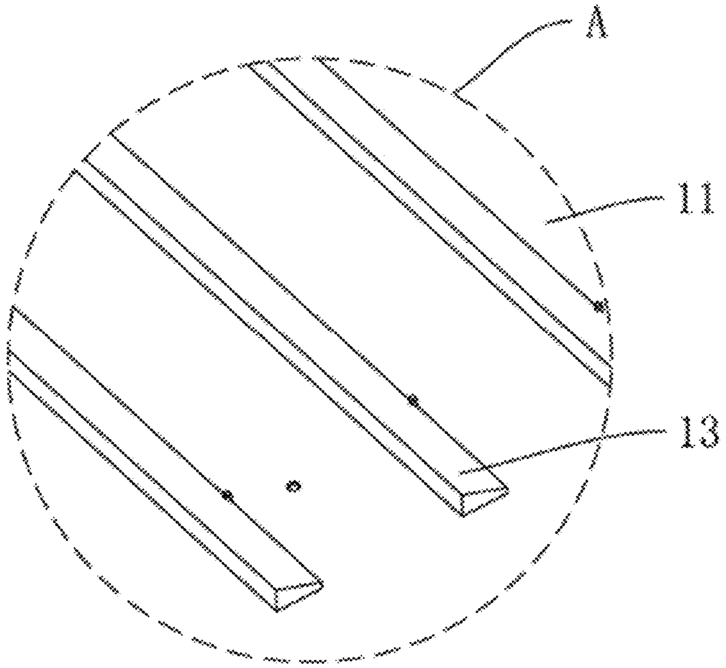
FIG. 3 is an enlarged structural diagram of the part A in FIG. 2.
Figure 4:
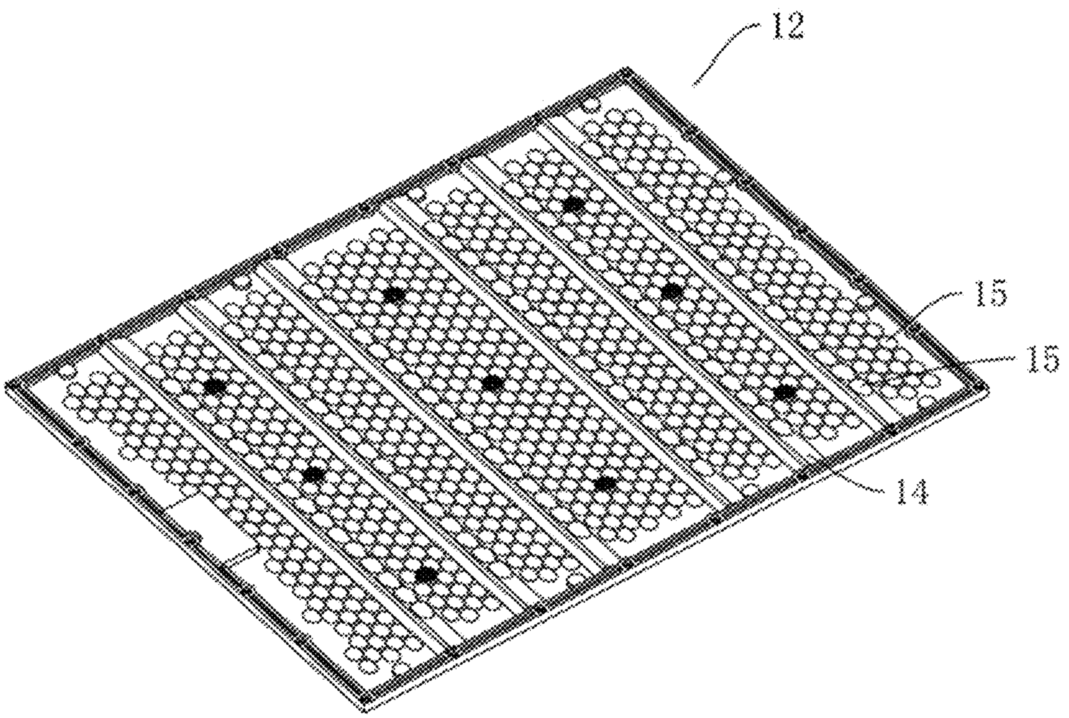
FIG. 4 is a structural diagram of a light transmission panel.

As shown in FIG. 2, the lamp housing 10 consists of a first groove (not marked in the figure) and a second groove 16, the controller and the carrier panel 11 are arranged in the first groove, the light transmission panel 12 is configured to cover an opening of the first groove, a power supply 17 is arranged in the second groove 16, and the lamp housing 10 is further provided with a power supply cover 18 for covering the second groove 16. The street lamp further comprises an induction assembly 19 electrically connected with the controller, and a through hole 181 is arranged on the power supply cover 18 for mounting the induction assembly 19.

In some embodiments, the street lamp further includes a rotating arm 32 assembly arranged at a side of the lamp housing 10. The rotating arm 32 assembly consists of a joint 31 for fixing and a rotating arm 32 rotatably connected with the joint 31. The rotating arm 32 is connected with the lamp housing 10 to facilitate mechanical adjustment of the angle of the lamp body and meet more illumination requirements.

Preferably, an inclination angle δ of the upper surface of the convex strip 13 ranges 0<δ<90°, and a ratio Q of a count of lamp beads of the light supplement assembly to a count of lamp beads of the lamp panel ranges from 10% to 50%.

Figure 5:
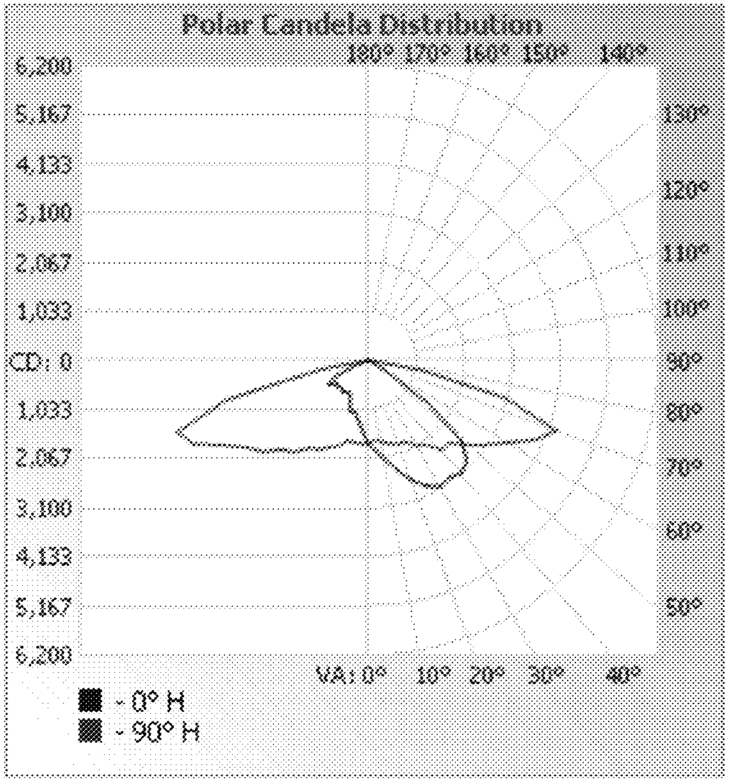
FIG. 5 is a graph showing the illumination intensity distribution of Type II lighting at the cross-section and the vertical section.
Figure 6:
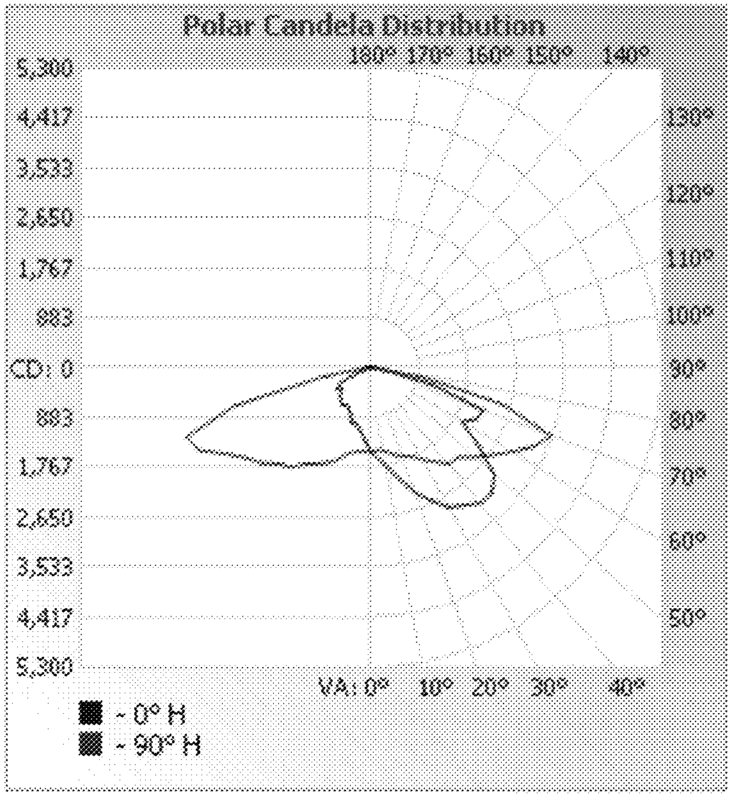
FIG. 6 is a graph showing the illumination intensity distribution of Type III lighting at the cross-section and the vertical section.
Figure 7:
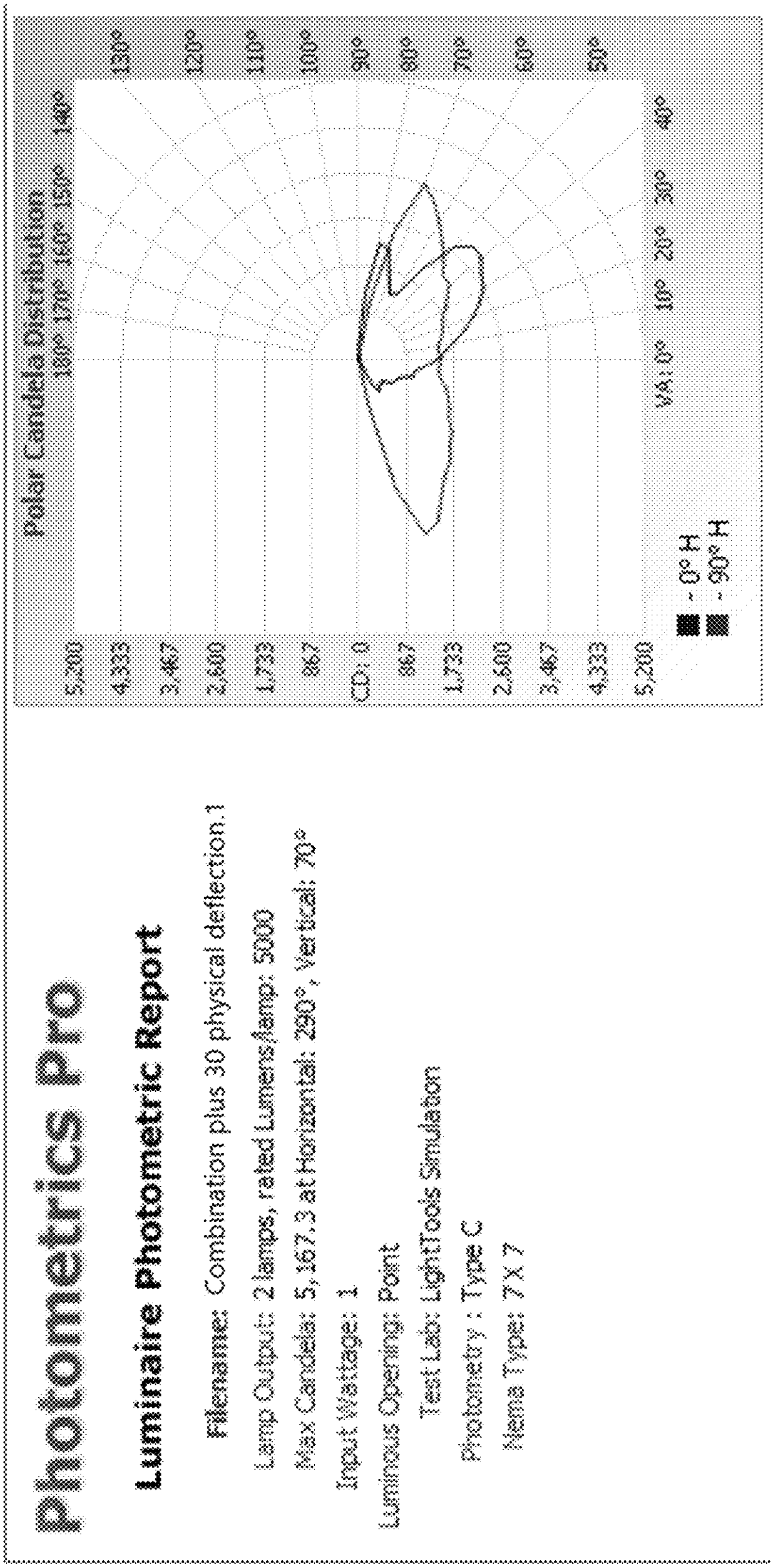
FIG. 7 is a graph showing the illumination intensity distribution of Type IV lighting at the cross-section and the vertical section.

Taking Q=30% as an example, in a first embodiment, only the lamp panel 20 illuminating can realize Type II lighting (as shown in FIG. 5), and on the basis, when δ=20°, both the lamp panel 20 and the light supplement assembly illuminating can realize Type III lighting (as shown in FIG. 6); when δ=30°, both the lamp panel 20 and the light supplement assembly illuminating can realize Type IV lighting (as shown in FIG. 7). As can be seen from FIGS. 5, 6 and 7, as the deflection angle increases, the farther the light is irradiated, the lower the illuminance at a nearby location will be.

In a second embodiment, δ=25° (convenient for production and processing) is selected. According to practice, Type III lighting can be realized when the light panel 20 illuminates and the light supplement assembly illuminates with a brightness of 30%; and Type IV lighting can be realized when the light panel 20 illuminates and the light supplement assembly illuminates with a brightness of 100%. The light supplement assembly illuminates with a brightness of 30%, including that only 30% of the light supplement strips 21 illuminate and the brightness of the light supplement strips 21 is 100%, or the brightness of all the light supplement strips 21 is 30%, respectively. Alternatively, some light supplement strips illuminate with a brightness of 100% and the brightness of some light supplement strips is relatively dark, so that the overall brightness of the light supplement assembly can reach 30%.

Figure 8:
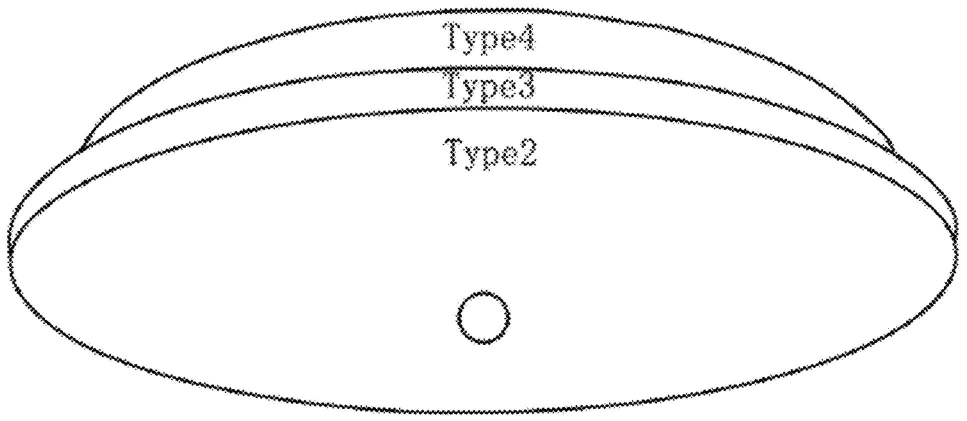
FIG. 8 illustrates a comparison of three types of lighting areas, i.e. Type II, Type III and Type IV.

As shown in FIG. 8, it can be seen that the lateral distance of Type II, Type III and Type IV lighting decreases in turn, the longitudinal distance increases in turn, and the lighting area increases in turn. It is further proved that the deflection angle of the light supplement assembly gradually increases.

Those skilled in the art can easily understand that, on the premise of no conflict, the above preferred modes may be freely combined and superimposed.

The above are only preferred embodiments of the present disclosure, and do not limit the patent scope of the present disclosure. Under the inventive concept of the present disclosure, any equivalent structure transformation made by using the contents of the description and drawings of the present disclosure or directly or indirectly applied to other related technical fields shall be included in the patent protection scope of the present disclosure.

What is claimed is:

1. A street lamp, comprising:

a lamp housing (10) and a carrier panel (11), a light transmission panel (12), a lamp panel (20), a light supplement assembly and a controller respectively arranged in the lamp housing (10);

the light supplement assembly comprises a plurality of light supplement strips (21); the carrier panel (11) is provided with a corresponding plurality of spaced convex strips (13), each convex strip (13) having an inclined upper surface; the lamp panel (20) is arranged on a surface of the carrier panel (11); each light supplement strip (21) is pasted on the upper surface of each corresponding convex strip (13);

the light transmission panel (12) is provided with a plurality of convex ribs (14), and the plurality of convex ribs (14) corresponds to the plurality of convex strips (13) one to one; a bottom of the convex rib (14) is provided with a groove to match the corresponding convex strip (13); an upper surface of the convex rib (14) is inclined and parallel to the upper surface of the convex strip (13), and a surface of the light transmission panel (12) and an upper surface of the convex rib (14) are provided with lenses (15) to correspond to the lamp beads on the lamp panel (20) and the light supplement assembly, respectively; the controller is electrically connected to the light panel (20) and the light supplement strip (21), respectively, so as to control on/off states of the light panel (20) and the plurality of light supplement strips (21), respectively.

2. The street lamp according to claim 1, wherein the lens (15) on the light transmission panel (12) is consistent with the lens (15) on the convex rib (14) in terms of specifications.

3. The street lamp according to claim 1, wherein the inclination directions of the upper surfaces of the plurality of convex strips (13) are consistent, and the inclination directions of the corresponding upper surfaces of the plurality of convex ribs (14) are consistent.

4. The street lamp according to claim 3, wherein an inclination angle δ of the upper surface of the convex strip (13) ranges from 0<δ<90°, and a ratio Q of a count of lamp beads of the light supplement assembly to a count of lamp beads of the lamp panel ranges from 10% to 50%.

5. The street lamp according to claim 4, wherein Q=30%.

6. The street lamp according to claim 5, wherein only the lamp panel (20) illuminating can realize Type II lighting, and on the basis, when δ=20°, both the lamp panel (20) and the light supplement assembly illuminating can realize Type III lighting; when δ=30°, both the lamp panel (20) and the light supplement assembly illuminating can realize Type IV lighting.

7. The street lamp according to claim 5, wherein when δ=25°, Type III lighting can be realized when the light panel (20) illuminates and the light supplement assembly illuminates with a brightness of 30%; and Type IV lighting can be realized when the light panel (20) illuminates and the light supplement assembly illuminates with a brightness of 100%.

8. The street lamp according to claim 7, wherein the light supplement assembly illuminates with a brightness of 30%, including that only 30% of the light supplement strips (21) illuminate and the brightness of the light supplement strips (21) is 100%, or the brightness of all the light supplement strips (21) is 30%, respectively.

9. The street lamp according to claim 1, wherein the lamp housing (10) consists of a first groove and a second groove (16), the controller and the carrier panel (11) are arranged in the first groove, the light transmission panel (12) is configured to cover an opening of the first groove, a power supply (17) is arranged in the second groove (16), and the lamp housing (10) is further provided with a power supply cover (18) for covering the second groove (16).

10. The street lamp according to claim 9, wherein the street lamp further comprises an induction assembly (19) electrically connected with the controller, and a through hole (181) is arranged on the power supply cover (18) for mounting the induction assembly (19).

* * * * *